ℹ️ US011636636B2

(12) United States Patent
MacGillivray et al.

(10) Patent No.: US 11,636,636 B2
(45) Date of Patent: Apr. 25, 2023

(54) DATA REDUCTION FOR GENERATING HEAT MAPS

(71) Applicant: GOOGLE LLC, Mountain View, CA (US)

(72) Inventors: Ian MacGillivray, New York, NY (US); Charles Han, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/309,031

(22) PCT Filed: Oct. 10, 2019

(86) PCT No.: PCT/US2019/055595
§ 371 (c)(1),
(2) Date: Apr. 15, 2021

(87) PCT Pub. No.: WO2020/086284
PCT Pub. Date: Apr. 30, 2020

(65) Prior Publication Data
US 2021/0358185 A1  Nov. 18, 2021

Related U.S. Application Data

(60) Provisional application No. 62/749,525, filed on Oct. 23, 2018.

(51) Int. Cl.
*G06T 11/20* (2006.01)
*G06F 9/451* (2018.01)
(Continued)

(52) U.S. Cl.
CPC ........ *G06T 11/206* (2013.01); *G06F 3/04815* (2013.01); *G06F 3/04845* (2013.01);
(Continued)

(58) Field of Classification Search
None
See application file for complete search history.

(56) References Cited

U.S. PATENT DOCUMENTS

2010/0295774 A1*  11/2010  Hennessey .............. G06F 3/013
382/103
2015/0302625 A1  10/2015  Greco et al.
(Continued)

OTHER PUBLICATIONS

Soussan Djamasbi; "Eye Tracking and Web Experience;" AIS Transactions on Human-Computer Interaction, 6(2), pp. 37-54. (Year: 2014).*

(Continued)

*Primary Examiner* — Edward Martello
(74) *Attorney, Agent, or Firm* — Brake Hughes Bellermann LLP

(57) ABSTRACT

Techniques of collecting and displaying data include mapping user interaction data having multiple components (or, dimensions) to a plurality of buckets representing a set of values of each of the components. When a user causes a computer to generate user interaction data by interacting with an object on an electronic display, the computer performs a mapping of the many components of the user interaction data to a plurality of buckets. Each bucket represents a set of values of the user interaction data. The number of buckets is far smaller than the number of possible data points. Accordingly, rather than individual, multidimensional data points being transmitted to another computer that compiles the user interaction data into heat maps, a relatively small number of bucket identifiers are transmitted. In this way, the analysis of the user interaction data requires minimal resources and can take place in real time.

20 Claims, 8 Drawing Sheets

(51) Int. Cl.
*G06F 16/901* (2019.01)
*G06F 3/04815* (2022.01)
*G06F 3/04845* (2022.01)
*G06T 11/00* (2006.01)
*G06Q 30/02* (2012.01)
G06Q 30/0242 (2023.01)
G06Q 30/0241 (2023.01)

(52) U.S. Cl.
CPC .......... *G06F 9/451* (2018.02); *G06F 16/9024* (2019.01); *G06T 11/001* (2013.01); *G06Q 30/0246* (2013.01); *G06Q 30/0277* (2013.01)

(56) References Cited

U.S. PATENT DOCUMENTS

2017/0249783 A1* 8/2017 Mach Shepherd ..... G06T 17/20
2018/0283876 A1 10/2018 Cregan
2019/0370550 A1* 12/2019 Chen ....................... G06F 3/011

OTHER PUBLICATIONS

International Search Report and Written Opinion for Application No. PCT/US2019/055595, dated Nov. 28, 2019, 16 pages.

\* cited by examiner

DATA REDUCTION FOR GENERATING HEAT MAPS

CROSS REFERENCE TO RELATED APPLICATION

This application is a 35 U.S.C. § 371 National Phase Entry Application from PCT/US2019/055595, filed Oct. 10, 2019, designating the U.S., and claims the benefit of U.S. Provisional Application No. 62/749,525, filed Oct. 23, 2018, the disclosures of which are incorporated herein by reference in their entireties.

TECHNICAL FIELD

This description relates to the generation of heat maps in real-time, data-intensive environments.

BACKGROUND

Some applications that provide advertisements on electronic displays are configured to collect user behavior data with regard to the advertisements. For example, an advertisement on an electronic device may display an image of an object. Conventional data collection applications may track certain types of user interactions such as a user rotating the object or translating the object on a display of the electronic device.

SUMMARY

In one general aspect, a method can include receiving, by processing circuitry of a first computer, target object data representing a target object displayed on a display. The method can also include receiving, by the processing circuitry, user interaction data, each user interaction datum of the user interaction data representing a value of a user interaction parameter having a plurality of components, the plurality of components including coordinates of a position of a point on the target object with which a user interacted at an instant of time. The method can further include performing, by the processing circuitry, a mapping operation to map the user interaction data to a plurality of buckets, each of the plurality of buckets representing a respective set of values of the user interaction parameter and having a respective bucket identifier. The method can further include sending, by the processing circuitry, the bucket identifier to a second computer configured to generate a heat map overlaid on a copy of the target object, the heat map being based on frequencies of bucket identifiers received by the second computer over a specified period of time.

In another aspect, a computer program product can comprise a non-transitory storage medium, the computer program product including code that, when executed by processing circuitry of a first computer, causes the processing circuitry to perform a method, the method comprising receiving target object data representing a target object displayed on a display; receiving user interaction data, each user interaction datum representing a value of a user interaction parameter having a plurality of components, the plurality of components including coordinates of a position of a point on the target object with which a user interacted at an instant of time; performing a mapping operation to map the user interaction data to a plurality of buckets, each of the plurality of buckets representing a respective combination of intervals of the plurality of components of the user interaction parameter and having a respective bucket identifier; and sending the bucket identifier to a second computer configured to generate a heat map juxtaposed on a copy of the target object, the heat map being based on frequencies of bucket identifiers received by the second computer over a specified period of time.

In another aspect, an electronic apparatus can comprise memory; and controlling circuitry coupled to the memory, the controlling circuitry being configured to receive target object data representing a target object displayed on a display; receive user interaction data, each user interaction datum of the user interaction data representing a value of a user interaction parameter having a plurality of components, the plurality of components including coordinates of a position of a point on the target object with which a user interacted at an instant of time; perform a mapping operation to map the user interaction data to a plurality of buckets, each of the plurality of buckets representing a respective set of values of the user interaction parameter and having a respective bucket identifier; and send the bucket identifier to a second computer configured to generate a heat map overlaid on a copy of the target object, the heat map being based on frequencies of bucket identifiers received by the second computer over a specified period of time.

In another general aspect, a method can include receiving, by processing circuitry of a computer, a plurality of bucket identifiers, each of the plurality of bucket identifiers corresponding to a respective set of values of a user interaction parameter having a plurality of components, the plurality of components including coordinates of a position of a point on a target object with which a user interacted at an instant of time, coordinates of a position of a camera configured to image the target object, and angular coordinates representing an orientation of a camera configured to image the target object. The method can also include performing, by the processing circuitry, a mapping operation to map each of the plurality of bucket identifiers to respective values of the user interaction parameter. The method can further include generating, by the processing circuitry, a heat map on a display device, the heat map based on the values of the user interaction parameter.

In another aspect, a computer program product can comprise a non-transitive storage medium, the computer program product including code that, when executed by processing circuitry of a computer, causes the processing circuitry to perform a method, the method comprising receiving a plurality of bucket identifiers, each of the plurality of bucket identifiers corresponding to a respective set of values of a user interaction parameter having a plurality of components, the plurality of components including coordinates of a position of a point on a target object with which a user interacted at an instant of time, coordinates of a position of a camera configured to image the target object, and angular coordinates representing an orientation of a camera configured to image the target object; performing a mapping operation to map each of the plurality of bucket identifiers to respective values of the user interaction parameter; and generating a heat map on a display device, the heat map based on the values of the user interaction parameter.

In another aspect, an electronic apparatus can comprise memory; and controlling circuitry coupled to the memory, the controlling circuitry being configured to receive a plurality of bucket identifiers, each of the plurality of bucket identifiers corresponding to a respective set of values of a user interaction parameter having a plurality of components, the plurality of components including coordinates of a position of a point on a target object with which a user interacted at an instant of time, coordinates of a position of a camera configured to image the target object, and angular coordinates representing an orientation of a camera configured to image the target object; perform a mapping operation to map each of the plurality of bucket identifiers to respective values of the user interaction parameter; and generate a heat map on a display device, the heat map based on the values of the user interaction parameter.

The details of one or more implementations are set forth in the accompanying drawings and the description below. Other features will be apparent from the description and drawings, and from the claims.

DETAILED DESCRIPTION

Figure 1:
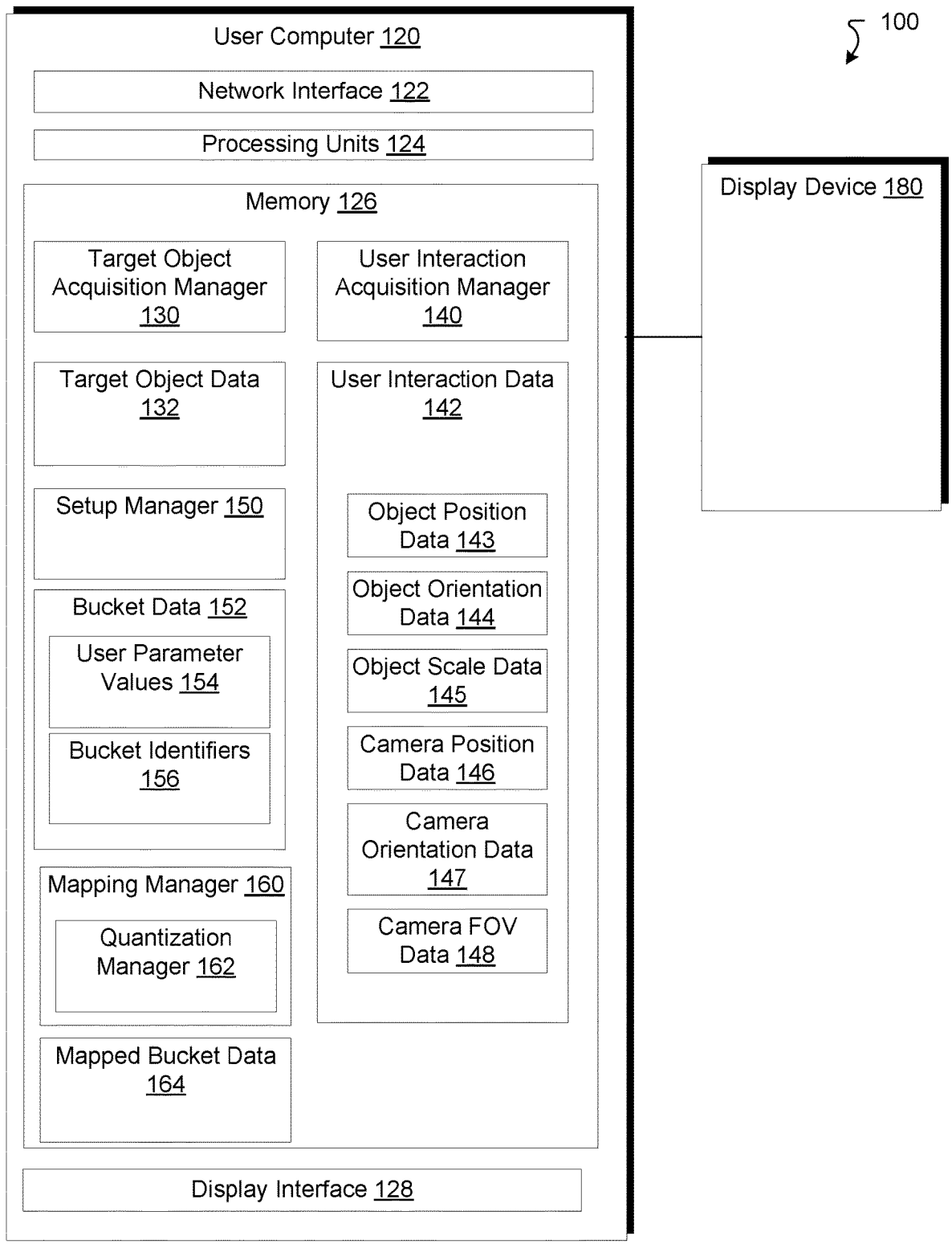
FIG. 1 is a diagram that illustrates an example electronic environment for implementing improved techniques described herein.

In accordance with the implementations described herein, improved techniques of collecting and displaying data in real time include mapping user interaction data having multiple components (or, dimensions) to a plurality of buckets representing a combination of intervals of each of the components. When a user causes a computer to generate user interaction data by interacting with an object on an electronic display, the computer performs a mapping of the many components of the user interaction data to a plurality of buckets. Each bucket represents a combination of intervals of components of the user interaction data. The number of buckets is far smaller than the number of possible data points. Accordingly, rather than individual, multidimensional data points being transmitted to another computer that compiles the user interaction data into heat maps, a relatively small number of bucket identifiers are transmitted. In this way, the analysis of the user interaction data requires minimal resources and can take place in real time.

For example, a user observing a three-dimensional target object representing a car on a display may be more interested in the portion of the car corresponding to the hood than in other parts. When the user interacts with this target object, the user may click on the portion of the target object corresponding to the hood more often than on other portions of the target object. The user may also orient the target object to get a different perspective of the hood. Further, the user may change a scale of the target object to focus on various details of the hood (e.g., the shape, an ornament). Between position, orientation, and scale, there are seven components to the user interaction data. Moreover, in some implementations, the user can also change perspective, or from what direction the target object is viewed, in the form of a camera. The camera may be described as having a position relative to the target object, an orientation, and a field of view (FOV). Accordingly, in this case there are 14 components to the user interaction data and thus the user interaction data is 14-dimensional. Nevertheless, this high-dimensional data may be organized into a few hundred or a few thousand discrete buckets. Accordingly, rather than send an enormous amount of raw user interaction data, the improved techniques allow for each datum to be represented by a bucket identifier that identifies a best-fit bucket for that user interaction datum.

Upon receipt of the bucket identifiers that best fit the user interaction data, an advertising computer performs an approximate inverse map from the bucket identifier to a point on the target object and a perspective. The advertising computer then juxtaposes a heat map of the mapped points for each perspective to a heat map, with each color representing a frequency of that point. In some implementations, the heat map can vary with perspective. In this way, an advertiser who produced the target object can get detailed information about which parts of the target object were of most interest to users.

The term bucket can refer to at least a set of values of a multi-dimensional parameter defining the user interaction data. In some implementations, when a multidimensional space of all or at least a portion of possible parameter values lies in a volume of that multidimensional space, a bucket can refer to a subvolume of the multidimensional space of such parameter values. In some implementations, the plurality of buckets used can correspond to a small (e.g., a very small) portion of the volume in multidimensional space. Nevertheless, the user interaction data may mostly or entirely occupy that small portion of the volume. In some implementations, the user interaction data may be divided into ranges, or intervals, of parameter values. In such implementations, each bucket may correspond to a combination of intervals, or ranges of the parameter values.

FIG. 1 is a diagram that illustrates an example electronic environment 100 in which the above-described improved techniques may be implemented. As shown, in FIG. 1, the example electronic environment 100 includes a user computer 120.

The user computer 120 is configured to collect user interaction data and map that user interaction data to discrete buckets. In some embodiments, one or more of the components of the user computer 120 can be, or can include processors (e.g., processing units 124) configured to process instructions stored in the memory 126. Examples of such instructions as depicted in FIG. 1 include a target object acquisition manager 130, a user interaction acquisition manager 140, a setup manager 150, and a mapping manager 160. Further, as illustrated in FIG. 1, the memory 126 is configured to store various data, which is described with respect to the respective managers that use such data.

The mapping manager 160 is configured to map user interaction data 142 to respective bucket identifiers 156 to produce mapped bucket data 162. The mapping manager 160 includes a quantization manager 162. The quantization manager 162 is configured to generate a fit metric that indicates a goodness of fit between a user interaction datum 142 and a bucket identified by a bucket identifier 156 and representing a combination of intervals of the components of the user interaction parameter. In some implementations, the metric is a mean square error. In some implementations, the metric is a mean absolute error. In some implementations, the metric is a minimax value.

The setup manager 150 is configured to generate bucket data 152 representing the buckets into which the values of the user interaction parameter, represented by the user interaction data 142, are sorted. In some implementations, the setup manager 150 is configured to generate the bucket data 152 by establishing ranges, or bounds, for each component of the user interaction parameter, dividing each component into set of values (e.g., intervals or combinations of intervals) based on the ranges, and combining a respective of some or all of the components to produce user parameter values 154. In some implementations, the setup manager 150 establishes intervals by generating a bounding volume about the target object. In some implementations, the setup manager 150 establishes set of values of the user parameter by defining ranges of triplets of Euler angles at each position of the camera (e.g., on the unit sphere). In some implementations, the set of values are generated according to a random process (e.g., an output of a random number generator). In some implementations, the set of values are generated according to a systematic process (e.g., Latin hypercubes).

The user parameter values 154 that correspond to respective bucket identifiers 156 do not necessarily include all possible combinations of intervals of all of the components of the user interaction parameter. In this way, the number of buckets may be held to a relatively small number, e.g., 100, 200, 500, 1000, 10000, and so on. The buckets are selected so as to provide a good approximation of the raw user interaction data 142 in order that heat maps of the user interaction data 142 based on the bucket identifiers 156 are a good representation of how the user interacts with the target object.

The target object acquisition manager 130 is configured to acquire target object data 132 associated with a target object (not shown in FIG. 1) from various sources. For example, in some implementations, the target object is a three-dimensional object represented on a two-dimensional display of a display device. A source of such a target object may be another computer (e.g., a web server hosting a website associated with an advertising campaign or a game) connected to the user computer 120 over a network. In such implementations, the target object may be displayed in a browser window displayed on a display device 180. In some implementations, a source of the target object data 132 is a local disk drive (e.g., a flash drive, a disk drive, and the like).

The target object data 132 represents the target object as displayed on an electronic display. In some implementations, the target object data 132 includes polygons and/or polyhedra arranged to form a three-dimensional object. In some implementations, the target object takes the form of a point cloud. In some implementations, the target object data 132 is in a compressed format using schemes such as entropy encoding, run-length the like. In some implementations, when the user computer 120 is used to process a virtual reality (VR) or augmented reality (AR) environment, the target object data 132 is formatted for use in the VR or AR environment, respectively.

For example, a VR environment is a software construct in which a user may interact with computer-generated, three-dimensional objects over a 360-degree, computer-generated visual field. An AR environment is a software construct in which a user may interact with computer-generated objects that are overlaid with real objects in the visual field of the user. In VR, the target object data 132 may then be a three-dimensional, computer-generated object in a VR environment. In AR, the target object data 132 may then be a three-dimensional, computer-generated object or a real object in an AR environment. In a VR system, the display 180 may take the form of a head-mounted display (HMD). In an AR system, the display 180 may take the form of transparent or semitransparent goggles.

The user interaction acquisition manager 140 is configured to acquire user interaction data 142 from an input/output (I/O) device used by a user. For example, when the user is interacting with the target object represented by the target object data 132, the user may click a mouse on various points on the target object as displayed on a display device. Using the mouse, the user may also move the position and/or orientation of the target object as displayed on the display device by dragging a cursor over the target object using the mouse. In some implementations, when the target object data is formatted for use in a VR or AR environment and the user computer 120 is used to process the VR or AR environment, the I/O device takes the form of a VR or AR controller.

The user interaction acquisition manager 140 is configured to receive, in response to each mouse click, VR or AR movement or other I/O event, user interaction data 142. For example, the user interaction data may represent a state of a digital environment as displayed on a display device (e.g., a monitor, a head-mounted device in a VR system, a transparent, head-mounted display in an AR system). The state is represented as a user interaction parameter having multiple components. Each component of the user interaction parameter can represent a coordinate of a point on the target object, an orientation of the target object with respect to a coordinate system defined in the space of the display device, a scale of the target object within the space of the display device, components of a camera orientation from which the target object is viewed, and so on. In response to an I/O event, the user computer 120 receives a value of the user interaction parameter with the coordinate of the point on the target object being the point at which the cursor appears on the target object when the user initiates the I/O event (e.g., clicks a mouse).

In some implementations, the user interaction manager 140 is configured to receive the user interaction data 142, representing new values of the user interaction parameter, at regular time intervals. For example, when the target object data 132 is acquired from a web server, the website hosted on the web server may provide instructions (e.g., via a browser script) to the computer 120 to collect user interaction data 132 at each specified period of time, e.g., every 0.05 seconds, 0.1 seconds, 0.2 seconds, 0.5 seconds, 1.0 seconds, and the like.

The user interaction data 142 represents values of the user interaction parameter described above. The user interaction data 142 contains multiple components. As shown in FIG. 1, the user interaction data 142 includes object position data 143, object orientation data 144, object scale data 145, camera position data 146, camera orientation data 147, and camera field of view (FOV) data 148. In some implementations, the user interaction data 142 may include other components such as coordinates of an occluding object that occludes the target object from the camera. In some implementations, the user interaction data 142 includes an occluding percentage of the target object that the occluding object occludes.

The object position data 143 represents points on the target object at which the user interacted with the target object as described above (e.g., via mouse clicks). In some implementations, the object position data 143 includes values of three coordinates (x, y, z) in a Cartesian coordinate system defined with respect to an origin in the space of the display device. In some implementations, the coordinates are defined in a different coordinate system (e.g., a cylindrical coordinate system, a spherical coordinate system, a prolate spheroidal coordinate system, an oblate spheroidal coordinate system, and so on). In some implementations, when the target object is two-dimensional, the object position data 143 includes values of two coordinates. In some implementations, the object position data 143 includes three additional coordinates corresponding to a translation of the object with respect to an initial position of a center of the object with respect to the origin of the coordinate system.

The object orientation data 144 represents an orientation of the object with respect to coordinate axes of the coordinate system in which the object position data 143 are defined. In some implementations, the object orientation data 144 includes a triplet of Euler angles ($\varphi$, $\theta$, $\psi$) with respect to the coordinate axes. In some implementations, the object orientation data 144 includes a triplet of direction cosines. In some implementations, the object orientation data 144 includes polar and azimuth angles in a spherical coordinate system.

The object scale data 145 represents an overall size of the target object as displayed on the display device with respect to an initial size of the target object. In some implementations, the object scale data 145 includes a scalar quantity so that the change in size of the target object is the same in all directions. In some implementations, the object scale data 145 has multiple components, corresponding to a situation in which the change in size of the target object is different in different directions.

The camera position data 146 represents a position with respect to a coordinate system of a camera by which the image of the object s presented on the display device, and in some implementations within a browser window. The camera itself is a simulation of an actual camera through which the user sees the target object from a particular perspective. In some implementations, the camera position data 146 includes values of three coordinates (x, y, z) in a Cartesian coordinate system defined with respect to an origin. In some implementations, the coordinates are defined in a different coordinate system (e.g., a cylindrical coordinate system, a spherical coordinate system, a prolate spheroidal coordinate system, an oblate spheroidal coordinate system, and so on). In some implementations, the camera position data 146 includes three additional coordinates corresponding to a translation of the object with respect to an initial position of a center of the object with respect to the origin of the coordinate system. In some implementations, the camera is at a fixed distance with respect to a point on the target object (or an origin of the coordinate system). In such an implementation, the camera position data 146 includes two coordinates representing a position on a unit sphere.

The camera orientation data 147 represents an orientation of the camera as described above with respect to a local coordinate system. In some implementations, the local coordinate system has an origin at the point represented by the camera position data 146. In some implementations, the camera orientation data 147 includes a triplet of Euler angles ($\varphi$, $\theta$, $\psi$) with respect to the local coordinate axes. In some implementations, the camera orientation data 147 includes a triplet of direction cosines. In some implementations, camera orientation data 147 includes polar and azimuth angles in a spherical coordinate system.

The camera FOV data 148 represents an angular extent over which the camera defined above captures an image. For example, a camera with a small FOV may need to be at a large distance from the target object to capture the extent of the target object. A camera with a large FOV, in contrast, may be at a small distance from the target object to capture the extent of the target object. In some implementations, the camera FOV data 148 includes a single angle (e.g., in degrees or radians). In some implementations, the camera FOV data 148 includes two angles, each angle corresponding to a respective axial direction. (For example, the FOV is the sagittal direction may be different than the FOV in the tangential direction.)

The user computer 120 includes a network interface 122, one or more processing units 124, memory 126, and a display interface 128. The network interface 122 includes, for example, Ethernet adaptors, Token Ring adaptors, and the like, for converting electronic and/or optical signals to electronic form for use by the user computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the user computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the user computer 120.

The components (e.g., modules, processing units 124) of the user computer 120 can be configured to operate based on one or more platforms (e.g., one or more similar or different platforms) that can include one or more types of hardware, software, firmware, operating systems, runtime libraries, and/or so forth. In some implementations, the components of the user computer 120 can be configured to operate within a cluster of devices (e.g., a server farm). In such an implementation, the functionality and processing of the components of the user computer 120 can be distributed to several devices of the cluster of devices.

The components of the user computer 120 can be, or can include, any type of hardware and/or software configured to process attributes. In some implementations, one or more portions of the components shown in the components of the user computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the user computer 120 can be, or can include, a software module configured for execution by at least one processor (not shown). In some implementations, the functionality of the components can be included in different modules and/or different components than those shown in FIG. 1.

Although not shown, in some implementations, the components of the user computer 120 (or portions thereof) can be configured to operate within, for example, a data center (e.g., a cloud computing environment), a computer system, one or more server/host devices, and/or so forth. In some implementations, the components of the user computer 120 (or portions thereof) can be configured to operate within a network. Thus, the components of the user computer 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the user computer 120 can be, or can include, processors configured to process instructions stored in a memory. For example, the target object acquisition manager 130 (and/or a portion thereof), the user interaction application manager 140 (and/or a portion thereof), the setup manager 150 (and/or a portion thereof), and the mapping manager 160 can be a combination of a processor and a memory configured to execute instructions related to a process to implement one or more functions.

Figure 2:
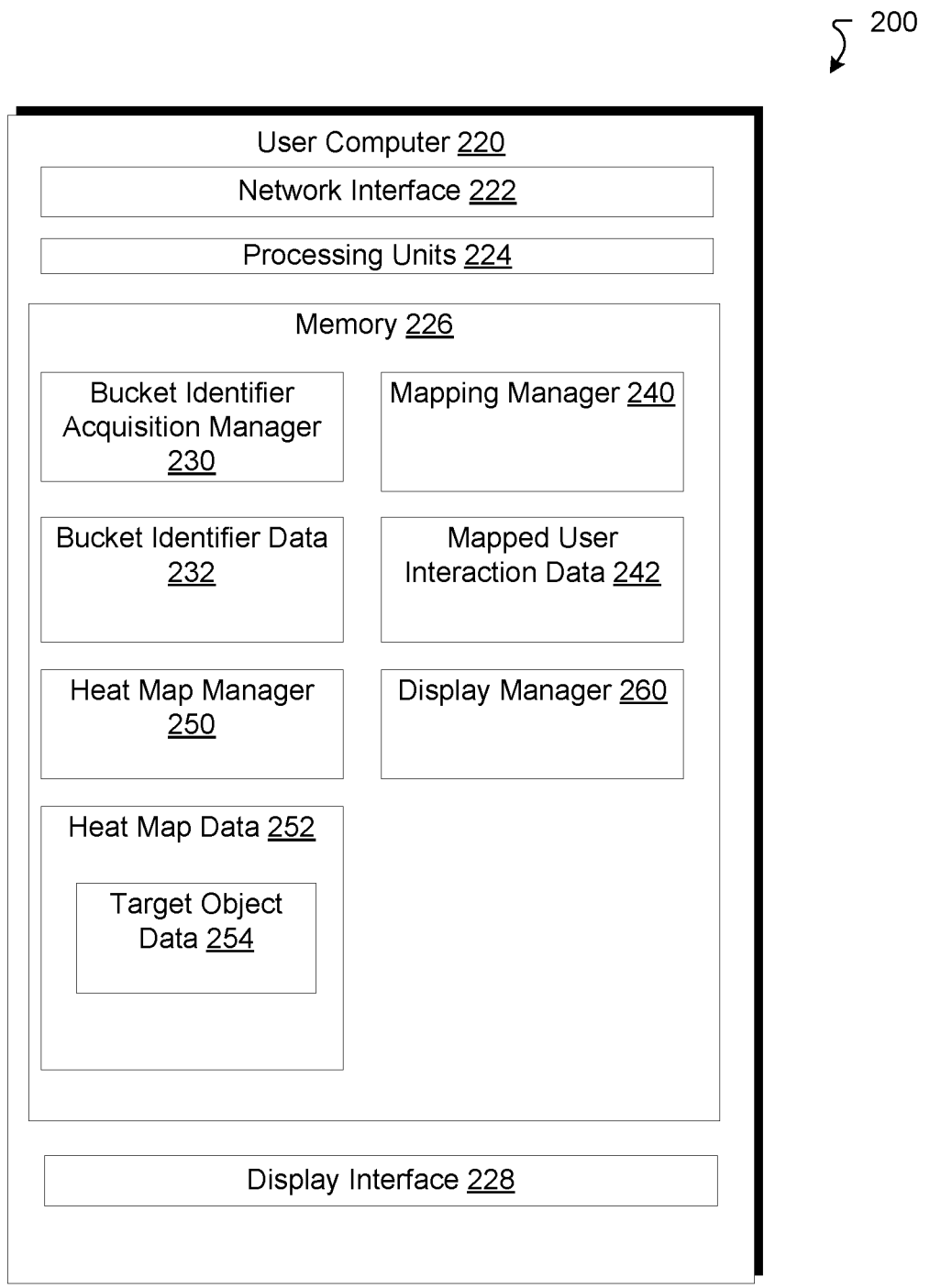
FIG. 2 is a diagram that illustrates another example electronic environment for implementing improved techniques described herein.

FIG. 2 is a diagram that illustrates an example electronic environment 200 in which the above-described improved techniques may be implemented. As shown, in FIG. 2, the example electronic environment 200 includes a user computer 220.

The user computer 220 is configured to receive bucket identifier data and generate heat maps based on the bucket identifier data. In some embodiments, one or more of the components of the user computer 120 can be, or can include processors (e.g., processing units 224) configured to process instructions stored in the memory 226. Examples of such instructions as depicted in FIG. 2 include a bucket identifier acquisition manager 230, a mapping acquisition manager 240, and a heat map manager 250. Further, as illustrated in FIG. 1, the memory 226 is configured to store various data, which is described with respect to the respective managers that use such data.

The mapping manager 240 is configured to map the bucket identifier data 232 to approximate, or mapped, user interaction data 242. In some implementations, the mapping process performed by the mapping manager 240 may be performed by a lookup table. In some implementations, when the bucket identifier data 232 includes additional information about the raw data (e.g., subinterval information), then the mapping manager 240 may produce the mapped user interaction data 242 via additional means (e.g., interpolation techniques).

The heat map manager 250 is configured to produce heat map data 252 which, upon rendering by the display interface 228, generates a heat map on a display device. In some implementations, the colors of the heat map represent a frequency of interactions (e.g., clicks) with points on the target object as expressed though the bucket identifier data 232 over a specified amount of time (e.g., 1 minute, 10 minutes, 1 hour, 2 hours, 6 hours, 12 hours, 1 day, 2 days, 1 week, and so on). In some implementations, the heat map data 252 includes target object data 254. In such implementations, the heat map manager 250 is further configured to juxtapose the generated heat map onto the target object as displayed on the display device. In some implementations, the heat map manager is further configured to generate controls by which a user may vary the heat map according to the components of the mapped user identification data 242 corresponding to camera positions and orientations.

The bucket identifier acquisition manager 230 is configured to acquire bucket identifier data 232 from the user computer 120. For example, if the user computer 120 collects user interaction data 142 and maps that data 142 to bucket identifiers 156 to produce the mapped bucket data 164 via a browser script, then the browser script may send the mapped bucket data 162 to the user computer 220 as the bucket identifier data 232. The user computer 220 is configured to enable, for example, the automatic selection of a particular data set (e.g., an advertisement) for recommendation to the advertiser for a particular region of the object depending on the heat and a size of the region.

The user computer 220 includes a network interface 222, one or more processing units 224, memory 226, and a display interface 228. The network interface 222 includes, for example, Ethernet adaptors, Token Ring adaptors, and the like, for converting electronic and/or optical signals to electronic form for use by the user computer 220. The set of processing units 224 include one or more processing chips and/or assemblies. The memory 226 includes both volatile memory (e.g., RAM) and non-volatile memory, such as one or more ROMs, disk drives, solid state drives, and the like. The set of processing units 224 and the memory 226 together form control circuitry, which is configured and arranged to carry out various methods and functions as described herein.

In some implementations, the memory 226 can be any type of memory such as a random-access memory, a disk drive memory, flash memory, and/or so forth. In some implementations, the memory 226 can be implemented as more than one memory component (e.g., more than one RAM component or disk drive memory) associated with the components of the user computer 220. In some implementations, the memory 226 can be a database memory. In some implementations, the memory 226 can be, or can include, a non-local memory. For example, the memory 226 can be, or can include, a memory shared by multiple devices (not shown). In some implementations, the memory 226 can be associated with a server device (not shown) within a network and configured to serve the components of the user computer 220.

The components (e.g., modules, processing units 224) of the user computer 220 can be configured to operate based on one or more platforms (e.g., one or more similar or different platforms) that can include one or more types of hardware, software, firmware, operating systems, runtime libraries, and/or so forth. In some implementations, the components of the user computer 220 can be configured to operate within a cluster of devices (e.g., a server farm). In such an implementation, the functionality and processing of the components of the user computer 220 can be distributed to several devices of the cluster of devices.

The components of the user computer 220 can be, or can include, any type of hardware and/or software configured to process attributes. In some implementations, one or more portions of the components shown in the components of the user computer 220 in FIG. 2 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the user computer 220 can be, or can include, a software module configured for execution by at least one processor (not shown). In some implementations, the functionality of the components can be included in different modules and/or different components than those shown in FIG. 2.

Although not shown, in some implementations, the components of the user computer 220 (or portions thereof) can be configured to operate within, for example, a data center (e.g., a cloud computing environment), a computer system, one or more server/host devices, and/or so forth. In some implementations, the components of the user computer 220 (or portions thereof) can be configured to operate within a network. Thus, the components of the user computer 220 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the user computer 220 can be, or can include, processors configured to process instructions stored in a memory. For example, the bucket identifier acquisition manager 230 (and/or a portion thereof), the mapping manager 240 (and/or a portion thereof), and the heat map manager 250 (and/or a portion thereof) can be a combination of a processor and a memory configured to execute instructions related to a process to implement one or more functions.

Figure 3:
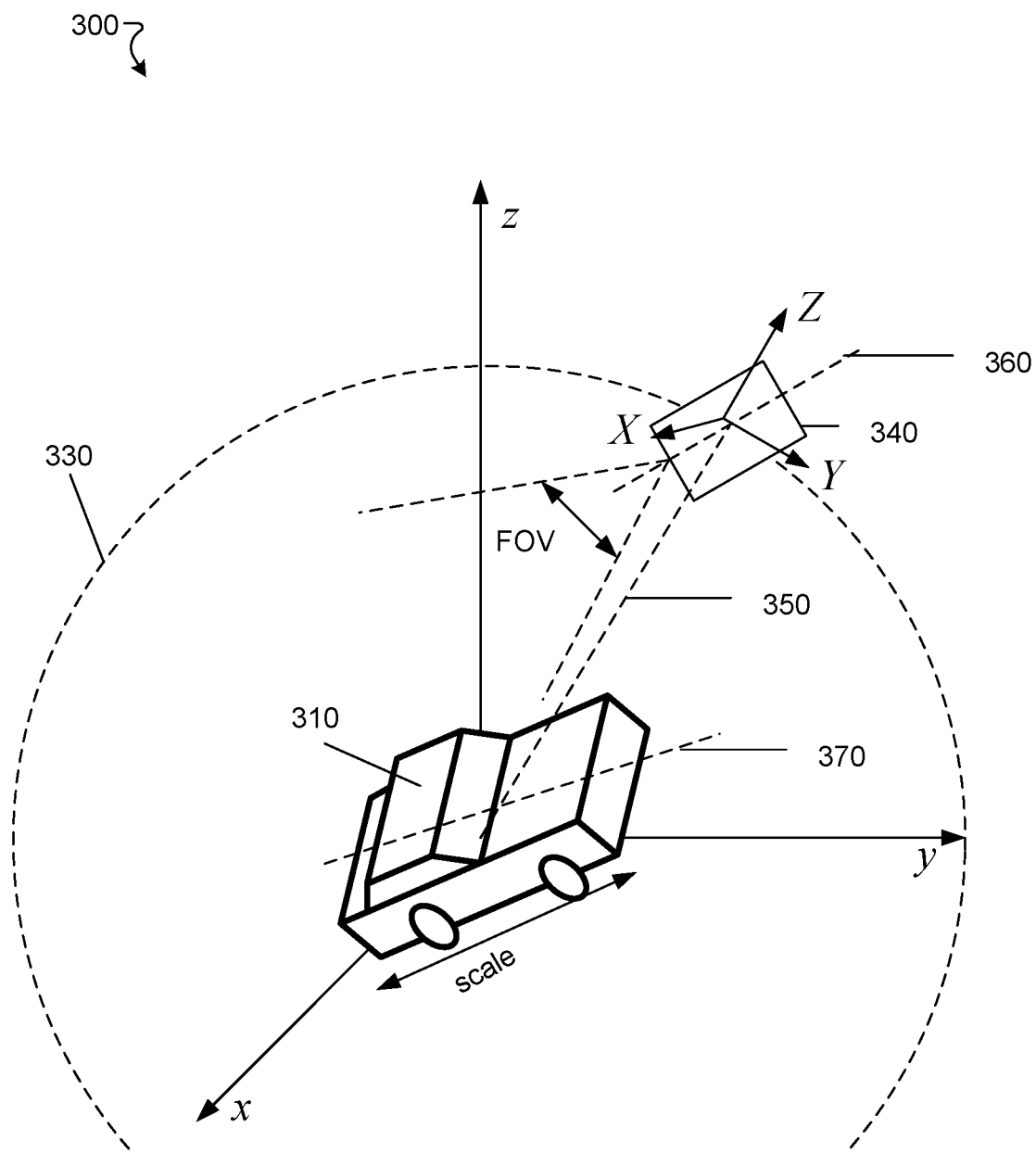
FIG. 3 is a diagram that illustrates an example environment involving a target object and a camera capturing the target object.

FIG. 3 is a diagram that illustrates an example environment 300 involving a target object 310 and a camera 340 observing the target object 310. As illustrated in FIG. 3, the target object 310 takes the form of a car. The target object 310 is placed at the origin of a Cartesian coordinate system with axes (x, y, z). The target object 310 is oriented at an angle with respect to an initial orientation, e.g., along the y-axis; this angle is illustrated through an axis 370 of the target object. The target object 310 is also sized within the coordinate system according to a scale corresponding to a length along the axis 370.

The camera 340 is situated on a surface of a sphere 330, within a local Cartesian coordinate system with axes (X, Y, Z) such that a radial line 350 from the origin of the coordinate system with axes (x, y, z) intersects the surface of the sphere 330 at the origin of the local coordinate system. The camera 340 is oriented at an angle with respect to the local coordinate system, and that orientation is illustrated through an axis 360 of the camera with respect to the radial line 350. The camera 340 has a FOV that represents an angular extent through which the camera may receive light. (The light source is assumed to be at infinity.)

Figure 4:
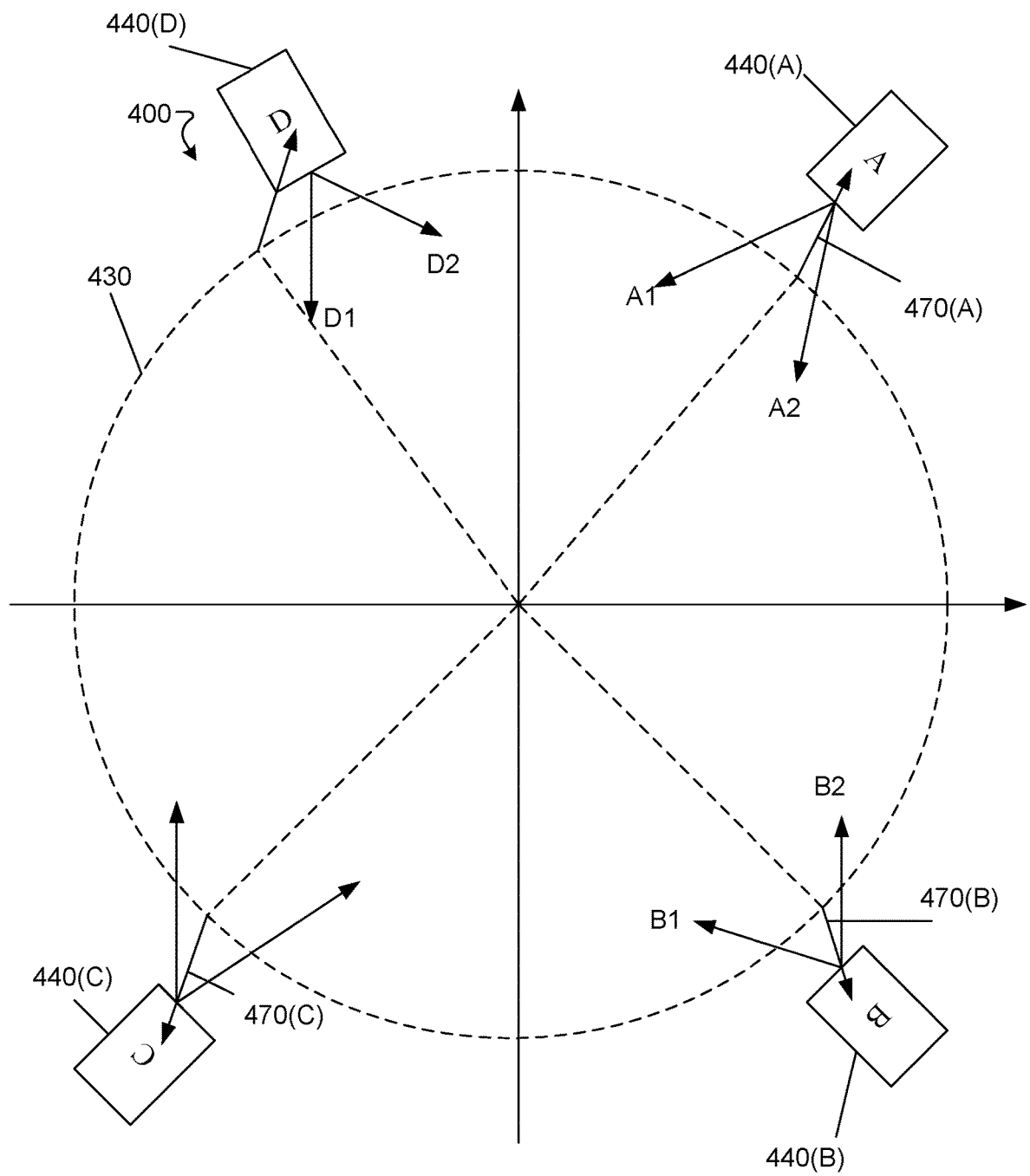
FIG. 4 is a diagram that illustrates an example setup operation in which samples of angle and position of the camera are taken.

FIG. 4 is a diagram that illustrates an example setup operation in an environment 400 in which samples of angle and position of the camera are taken to produce the buckets. As shown in FIG. 4, there are four samples of camera position about the sphere 430: 440(A), 440(B), 440(C), and 440(D). At each of the four positions, there are two camera orientations sampled (e.g., A1 and A2 for position 440(A), and so on). Because the cameras are distributed about the sphere 430, it may be assumed that the FOVs for the cameras is fixed as the camera traverses to the various positions 440(A-D) on the sphere 430. In some implementations in which a higher fidelity is needed, there may be more samples than the four positions and two angles per position shown in FIG. 4. At the center of the sphere 330 lies the target object.

In this case, each of the sampled orientations at each position A1, A2, B1, B2, . . . , D1, D2 may correspond to a respective bucket. That is, in this simple case, each bucket is simply a combination of an orientation and a position of a camera. In some implementations, and as shown in FIG. 4, the cameras at the positions 440(A-D) are also displaced from the origins of their respective local coordinate systems by respective displacement vectors 470(A-D). In some implementations, the setup operation determines each displacement by a movement of the target object such that the target object appears to be at its initial position from the camera's perspective. In some implementations, the setup operation determines each displacement by verifying that the FOV of the camera is within a specified tolerance (e.g., 10%, 5%, 1%, and so on) of the FOV of the camera in an initial state.

Once the buckets have been produced as a result of the setup operation, the user computer 120 (FIG. 1) is then ready to perform a quantization operation to map raw user interaction data to the buckets. In this stage, the quantization manager 162 translates the target object and the cameras back to an initial state. Then, for each user interaction datum, the quantization manager 162 finds the bucket that provides a best fit to that datum as described above. The identifier of that bucket is then sent to the user computer 220 for the generation of a heat map.

Figure 5A:
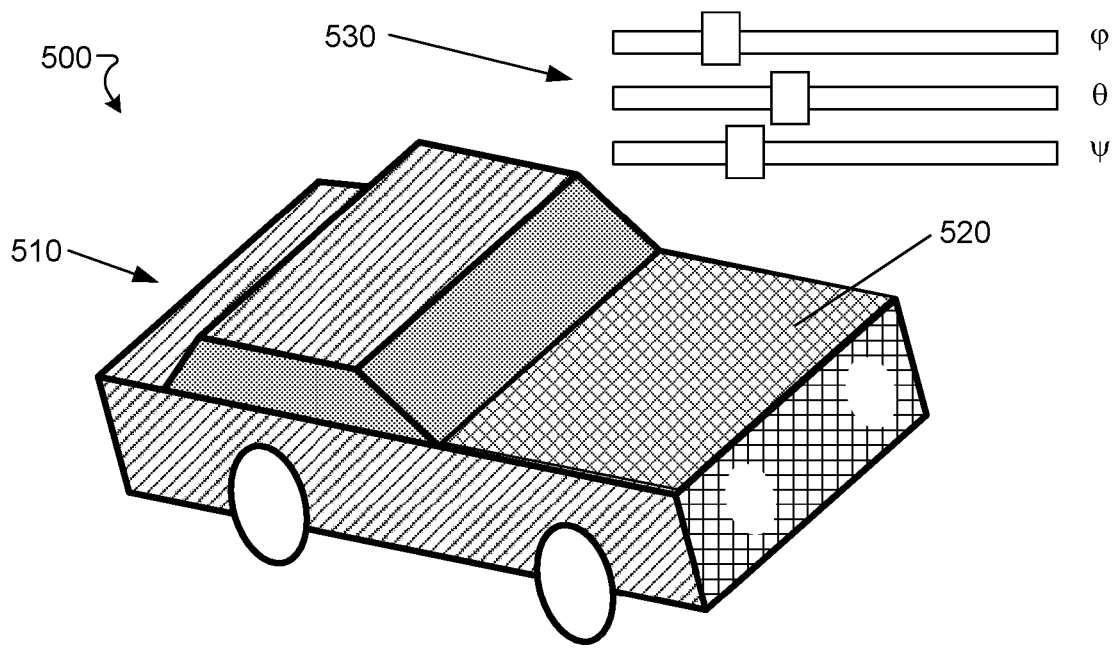
FIGS. 5A and 5B are diagrams that illustrate example heat maps and controls that indicate respective camera orientations.

FIG. 5A is a diagram that illustrates a display 500 including an example heat map 510 and controls 530 that indicate respective camera orientations. As shown in FIG. 5A, the heat map 510 is overlaid on a target object, which in this case is a car. The various hatch patterns in the heat map 510 represent colors, which in turn represent frequencies of user interactions (e.g., mouse clicks). In the example shown in FIG. 5A, the number of buckets is relatively small so that there are large areas on the target object having the same color.

As shown in FIG. 5A, the hood 520 of the car is colored differently than the other portions of the car. In this case, it may be assumed that the user had the most interactions with the hood 520 than with the other portions. An advertiser viewing this heat map may then assume that the user had more interest in the hood 520 than other portions of the car.

The controls 530 correspond to Euler angles that represent the orientation of a camera providing a particular viewing perspective on the car. That is, if the advertiser moves the controls to different angles, then the heat map 510 may change colors. In this way, the advertiser may understand how the user's interaction changes as the perspective changes.

Figure 5B:
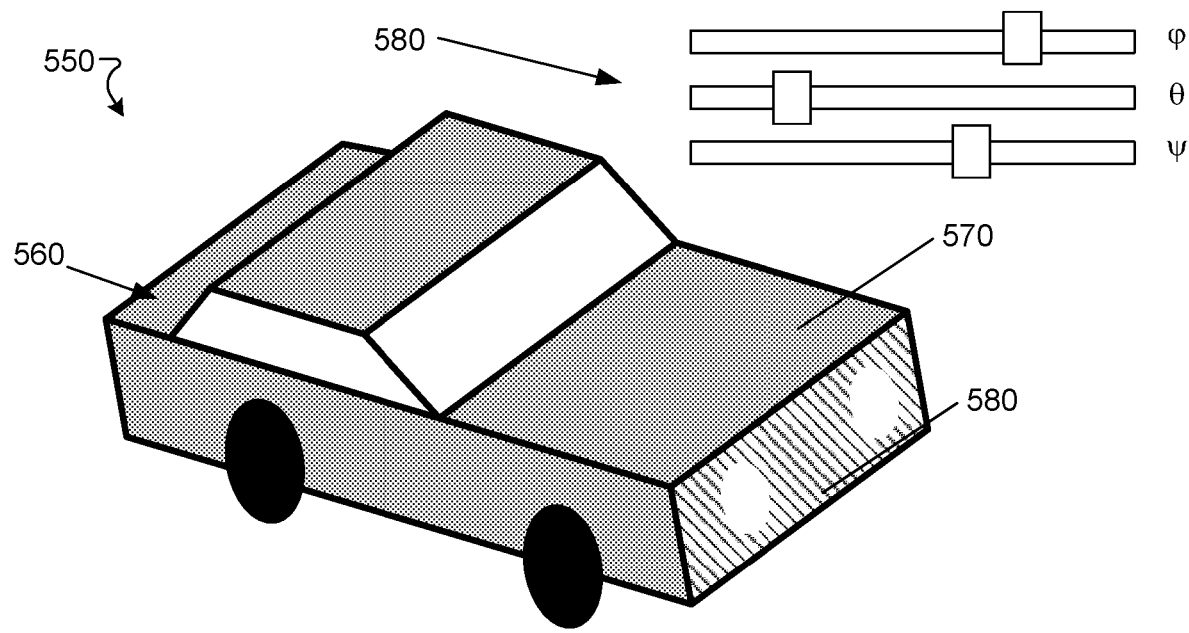

FIG. 5B is a diagram that illustrates a display 550 including an example heat map 560 and controls 580 that indicate respective camera orientations. Here, the controls 580 are set to a different position, implying a different set of Euler angles for the camera. Here, the heat map 560 is different than the heat map 510 in that the colors are more uniform in the heat map 560, even on the hood 570. In fact, the only colors that are different are on the grille 580. This may imply that the portion of the car of most interest to the user changes with perspective.

Figure 6:
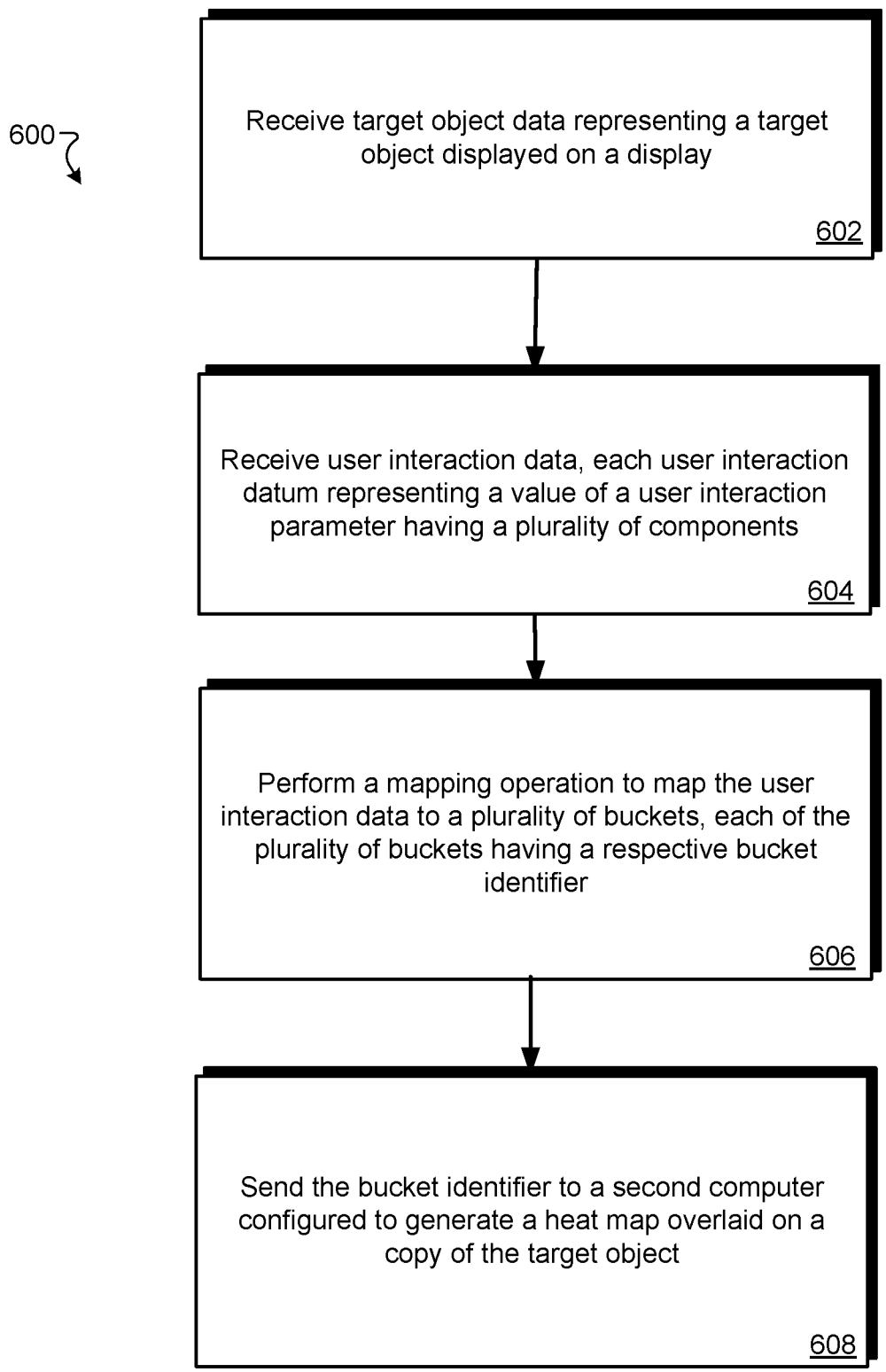
FIG. 6 is a flow chart that illustrates an example method of performing the improved techniques within the electronic environment shown in FIG. 1.

FIG. 6 is a flow chart that illustrates an example method 600 of mapping user interaction data to discrete buckets. The method 600 may be performed by software constructs described in connection with FIG. 1, which reside in memory 126 of the user computer 120 and are run by the set of processing units 124.

At 602, the target object acquisition manager 130 receives target object data 132 representing a target object displayed on a display.

At 604, the user interaction acquisition manager 140 receives user interaction data 142. Each user interaction datum represents a value of a user interaction parameter having a plurality of components, the plurality of components including coordinates of a position of a point on the target object with which a user interacted at an instant of time.

At 606, the mapping manager 160 performs a mapping operation to map the user interaction data 140 to a plurality of buckets, each of the plurality of buckets representing a respective set of values of the user interaction parameter and having a respective bucket identifier 156.

At 608, the user computer 120 sends the bucket identifier 156 to a second computer 220 configured to generate a heat map overlaid on a copy of the target object, the heat map being based on frequencies of bucket identifiers 156 received by the second computer 220 over a specified period of time.

Figure 7:
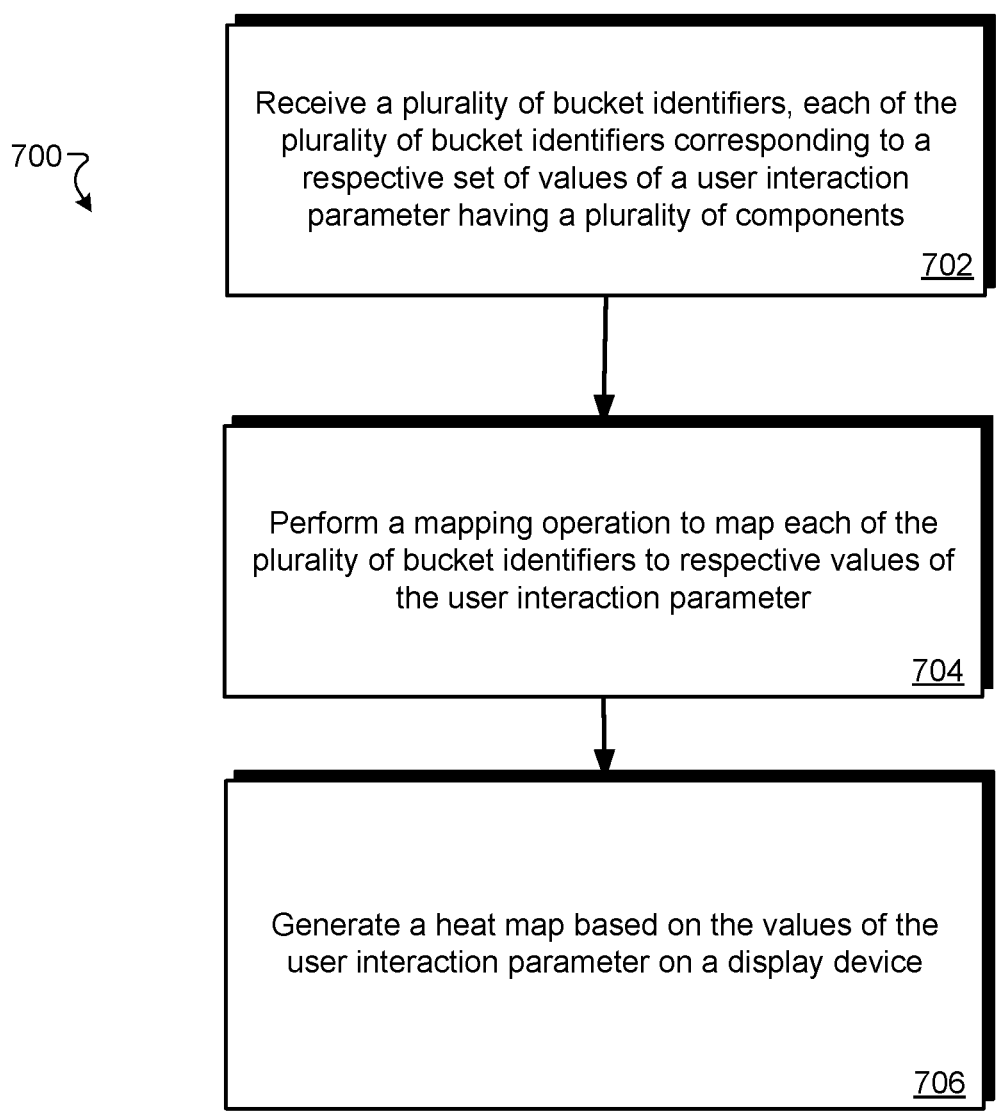
FIG. 7 is a flow chart that illustrates an example method of performing the improved techniques within the electronic environment shown in FIG. 2.

FIG. 7 is a flow chart that illustrates an example method 700 of generating heat maps from discrete buckets. The method 700 may be performed by software constructs described in connection with FIG. 2, which reside in memory 226 of the user computer 220 and are run by the set of processing units 224.

At 702, the bucket identifier acquisition manager 230 receives a plurality of bucket identifiers 232. Each of the plurality of bucket identifiers 232 corresponds to a respective set of values of a user interaction parameter having a plurality of components, the plurality of components including coordinates of a position of a point on a target object with which a user interacted at an instant of time, coordinates of a position of a camera configured to image the target object, and angular coordinates representing an orientation of a camera configured to image the target object.

At 704, the mapping manager 240 performs a mapping operation to map each of the plurality of bucket identifiers to respective values of the user interaction parameter.

At 706, the heat map manager 250 generates a heat map based on the values of the user interaction parameter on a display device.

Figure 8:
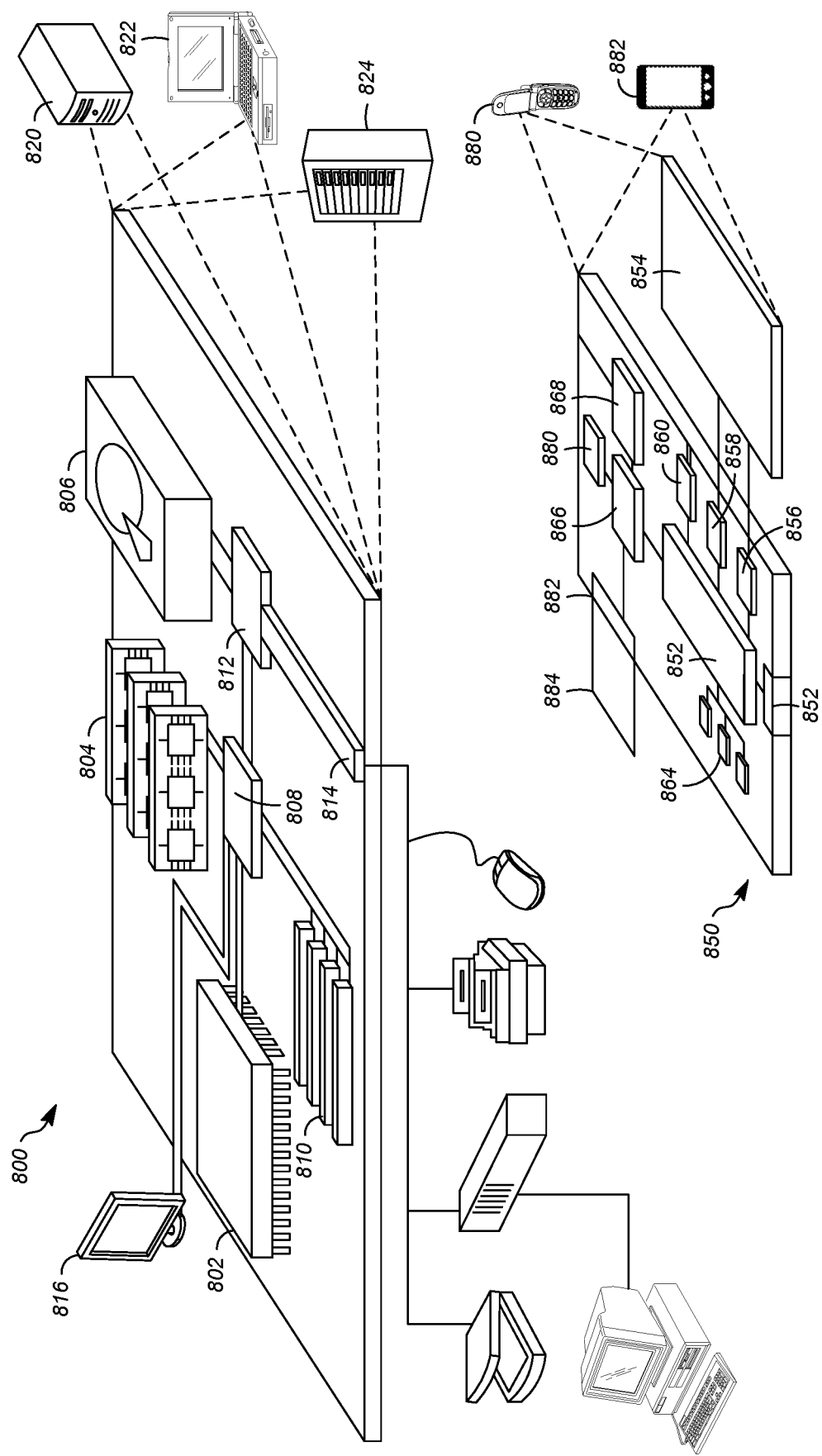
FIG. 8 illustrates an example of a computer device and a mobile computer device that can be used with circuits described here.

FIG. 8 illustrates an example of a generic computer device 800 and a generic mobile computer device 850, which may be used with the techniques described here.

As shown in FIG. 8, computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 466, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 480. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method performed by a first computer, comprising:
   receiving target object data representing a target object displayed on a display;
   receiving user interaction data, each user interaction datum of the user interaction data representing a value of a user interaction parameter having a plurality of components, the plurality of components including coordinates of a position of a point on the target object with which a user interacted at a first time;
   performing a mapping operation to map the user interaction data to a plurality of buckets, each of the plurality of buckets representing a respective set of values of the user interaction parameter and having a respective bucket identifier, including performing a quantization operation to produce, for a user interaction datum, a fit metric indicating a goodness of fit between a value of the user interaction parameter of a respective bucket of the plurality of buckets and the value of the user interaction parameter represented by the user interaction datum; and
   sending the respective bucket identifier to a second computer configured to generate a heat map overlaid on a copy of the target object, the heat map being based on frequencies of bucket identifiers received by the second computer over a specified period of time.

2. The method as in claim 1, wherein the plurality of components of the user interaction parameter further includes angular coordinates representing an orientation of the target object relative to an initial orientation.

3. The method as in claim 1, wherein the plurality of components of the user interaction parameter further includes coordinates of a position of a camera configured to image the target object.

4. The method as in claim 1, wherein the plurality of components of the user interaction parameter further includes angular coordinates representing an orientation of a camera configured to image the target object, and a field of view (FOV) of the camera.

5. The method as in claim 1, wherein the plurality of components of the user interaction parameter further includes coordinates representing an occluding object that occludes the target object from a camera configured to image the target object.

6. The method as in claim 1, further comprising:
   receiving respective values corresponding to each of the plurality of components of the user interaction parameter; and
   performing a setup operation to produce the plurality of buckets based on the respective values corresponding to each of the plurality of components of the user interaction parameter.

7. The method as in claim 6, wherein performing the setup operation includes:
   fixing a value of a field of view (FOV) of a camera configured to image the target object; and
   sampling, at even intervals in angular coordinates, a position of the camera over a unit sphere to produce the plurality of buckets.

8. The method as in claim 7, wherein possible orientations of the camera are represented by triplets of Euler angles; and
   wherein performing the setup operation further includes:
   defining respective triplets of Euler angles at each position on the unit sphere.

9. The method as in claim 1, wherein performing the mapping operation further includes:
   determining a translation of position of a camera configured to image the target object such that a field of view (FOV) of the camera is within a specified tolerance of the FOV of the camera in an initial state.

10. The method as in claim 1, wherein the fit metric includes a mean square error.

11. A method, comprising:
receiving, by processing circuitry of a computer, a plurality of bucket identifiers, each of the plurality of bucket identifiers corresponding to a respective set of values of a user interaction parameter having a plurality of components, the plurality of components including coordinates of a position of a point on a target object with which a user interacted at an instant of time, coordinates of a position of a camera configured to image the target object, and angular coordinates representing an orientation of a camera configured to image the target object;
performing, by the processing circuitry, a mapping operation to map each of the plurality of bucket identifiers to respective values of the user interaction parameter;
generating, by the processing circuitry, a heat map on a display device, the heat map based on the respective values of the user interaction parameter; and
generating a control represented by a control element on the display device, the control element being configured to enable a user to adjust the heat map according to the orientation of the camera.

12. The method as in claim 11, wherein the heat map is overlaid with an image of the target object on the display device.

13. A computer program product comprising a non-transitory storage medium, the computer program product including code that, when executed by processing circuitry of a first computer, causes the processing circuitry to perform a method, the method comprising:
receiving target object data representing a target object displayed on a display;
receiving user interaction data, each user interaction datum representing a value of a user interaction parameter having a plurality of components, the plurality of components including coordinates of a position of a point on the target object with which a user interacted at an instant of time;
performing a mapping operation to map the user interaction data to a plurality of buckets, each of the plurality of buckets representing a respective combination of intervals of the plurality of components of the user interaction parameter and having a respective bucket identifier, including performing a quantization operation to produce, for a user interaction datum, a fit metric indicating a goodness of fit between a value of the user interaction parameter of a respective bucket of the plurality of buckets and the value of the user interaction parameter represented by the user interaction datum; and
sending the respective bucket identifier to a second computer configured to generate a heat map juxtaposed on a copy of the target object, the heat map being based on frequencies of bucket identifiers received by the second computer over a specified period of time.

14. The computer program product as in claim 13, further comprising:
receiving respective values corresponding to each of the plurality of components of the user interaction parameter; and
performing a setup operation to produce the plurality of buckets based on the respective values corresponding to each of the plurality of components of the user interaction parameter.

15. The computer program product as in claim 14, wherein performing the setup operation includes:
fixing a value of a field of view (FOV) of a camera configured to image the target object; and
sampling at even intervals in angular coordinates, a position of the camera over a unit sphere to produce the plurality of buckets.

16. The computer program product as in claim 15, wherein possible orientations of the camera are represented by triplets of Euler angles; and
wherein performing the setup operation further includes:
defining respective triplets of Euler angles at each position on the unit sphere.

17. The computer program product as in claim 13, wherein performing the mapping operation further includes:
determining a translation of position of a camera configured to image the target object such that a field of view (FOV) of the camera is within a specified tolerance of a user's current FOV.

18. A computer program product comprising a non-transitory storage medium, the computer program product including code that, when executed by processing circuitry of a computer, causes the processing circuitry to perform a method, the method comprising:
receiving a plurality of bucket identifiers, each of the plurality of bucket identifiers corresponding to a respective set of values of a user interaction parameter having a plurality of components, the plurality of components including coordinates of a position of a point on a target object with which a user interacted at an instant of time, coordinates of a position of a camera configured to image the target object, and angular coordinates representing an orientation of a camera configured to image the target object;
performing a mapping operation to map each of the plurality of bucket identifiers to respective values of the user interaction parameter;
generating a heat map on a display device, the heat map based on the respective values of the user interaction parameter; and
generating a control represented by a control element on the display device, the control element being configured to enable a user to adjust the heat map according to the orientation of the camera.

19. An electronic apparatus, comprising:
memory; and
controlling circuitry coupled to the memory, the controlling circuitry being configured to:
receive target object data representing a target object displayed on a display;
receive user interaction data, each user interaction datum of the user interaction data representing a value of a user interaction parameter having a plurality of components, the plurality of components including coordinates of a position of a point on the target object with which a user interacted at an instant of time;
perform a mapping operation to map the user interaction data to a plurality of buckets, each of the plurality of buckets representing a respective set of values of the user interaction parameter and having a respective bucket identifier; and send the respective bucket identifier to a second computer configured to generate a heat map overlaid on a copy of the target object, the heat map being based on frequencies of bucket identifiers received by the second computer over a specified period of time, wherein the controlling circuitry configured to perform the mapping operation is further configured to perform a quantization operation to produce, for a user interaction datum, a fit metric indicating a goodness of fit between a value of the user interaction parameter of a respective bucket of the plurality of buckets and the value of the user interaction parameter represented by the user interaction datum.

20. An electronic apparatus, comprising:

memory; and controlling circuitry coupled to the memory, the controlling circuitry being configured to:

receive a plurality of bucket identifiers, each of the plurality of bucket identifiers corresponding to a respective set of values of a user interaction parameter having a plurality of components, the plurality of components including coordinates of a position of a point on a target object with which a user interacted at an instant of time, coordinates of a position of a camera configured to image the target object, and angular coordinates representing an orientation of a camera configured to image the target object;

perform a mapping operation to map each of the plurality of bucket identifiers to respective values of the user interaction parameter;

generate a heat map on a display device, the heat map based on the respective values of the user interaction parameter; and generate a control represented by a control element on the display device, the control element being configured to enable a user to adjust the heat map according to the orientation of the camera.

* * * * *